May 22, 1962 L. W. G. ALEXANDER ETAL 3,036,271

APPARATUS FOR SEPARATING THE RECTANGULAR AND PULSED FORM COMPONENT SIGNALS OF A COMPOSITE ELECTRICAL SIGNAL

Filed Aug. 12, 1960 3 Sheets-Sheet 1

Inventors
L. W. G. ALEXANDER
LOCKHART TAYLOR
By
Cameron, Kerkam & Sutton
Attorneys Inventors
L.W.G. ALEXANDER
LOCKHART TAYLOR
By
Cameron, Kerkam & Sutton
Attorneys APPARATUS FOR SEPARATING THE RECTANGULAR AND PULSED FORM COMPONENT SIGNALS OF A COMPOSITE ELECTRICAL SIGNAL Filed Aug. 12, 1960 3 Sheets-Sheet 3

Inventors
L. W. G. ALEXANDER
LOCKHART TAYLOR
By
Cameron, Kerkam & Sutton
Attorneys United States Patent Office 3,036,271 Patented May 22, 1962

3,036,271

APPARATUS FOR SEPARATING THE RECTANGULAR AND PULSED FORM COMPONENT SIGNALS OF A COMPOSITE ELECTRICAL SIGNAL

Ludovic W. G. Alexander and Lockhart Taylor, Edinburgh, Scotland, assignors to Ferranti, Limited, Hollinwood, Lancashire, England, a company of Great Britain and Northern Ireland Filed Aug. 12, 1960, Ser. No. 49,204
Claims priority, application Great Britain Aug. 14, 1959
8 Claims. (Cl. 328—109)

This invention relates to electrical signal-separating apparatus.

It is known to represent intelligence by modulating in frequency or phase a rectangular signal waveform, electrical or magnetic, relative to some standard such as a reference waveform.

Auxiliary information may be added to any such signal in the form of a pulse contained within a half-cycle of the waveform of opposite sense to the pulse. As the rectangular waveform is of variable wavelength the pulse must be shorter than the shortest half-cycle, as determined by the modulation.

Instead of being represented by one pulse, an auxiliary signal may be represented by a predetermined number of such pulses, of like sense, contained within a like number of successive half-cycles of the opposite sense, each to each—that is, one pulse per half-cycle. There is thus formed a composite signal waveform consisting of what will hereinafter be termed a main signal, that of the rectangular waveform, which is of variable wavelength, and an auxiliary signal, that of pulsed form.

An object of the present invention is to provide apparatus for separating the main and the auxiliary signals from such a composite signal waveform.

In accordance with the present invention, apparatus for separating the component signals of at least one composite electrical signal consisting of a main signal of rectangular waveform of variable wavelength and an auxiliary signal in the form of a predetermined number of pulses of one sense contained within a like number, each to each, of successive half-cycles of the other sense of the main signal, includes for each composite signal a pulse generator arranged to be actuated by the leading edge of each half-cycle of said other sense of the main signal to generate at least one gating pulse short enough to be contained within that half-cycle and long enough to contain an auxiliary signal pulse if present in that half-cycle, main-signal separating means arranged to utilize gating pulses from said generator to derive from the composite signal the main signal only, auxiliary-signal separating means arranged to utilize such gating pulses to derive from the composite signal the auxiliary signal pulses only, an integrating stage arranged to receive the auxiliary signal pulses from said separating means and to derive a response whenever a predetermined proportion of said number of those pulses is received during the period allocated to the reception of said number of them, and output arrangements for actuation by the response of the integrating stage.

The expressions "contain" and "contained" as used throughout this specification and claims with reference to pulses within rectangular half-cycle waves or within other pulses should be understood as excluding any overlap in time, or any edge coincidence, of the containing and contained waveform. In other words, the leading edge of the half-cycle or longer pulse (as the case may be) precedes (if only very slightly) the leading edge of the contained pulse, and the trailing edge of the contained pulse precedes that of the containing half-cycle or longer pulse.

In the accompanying drawings.

Figure 1:
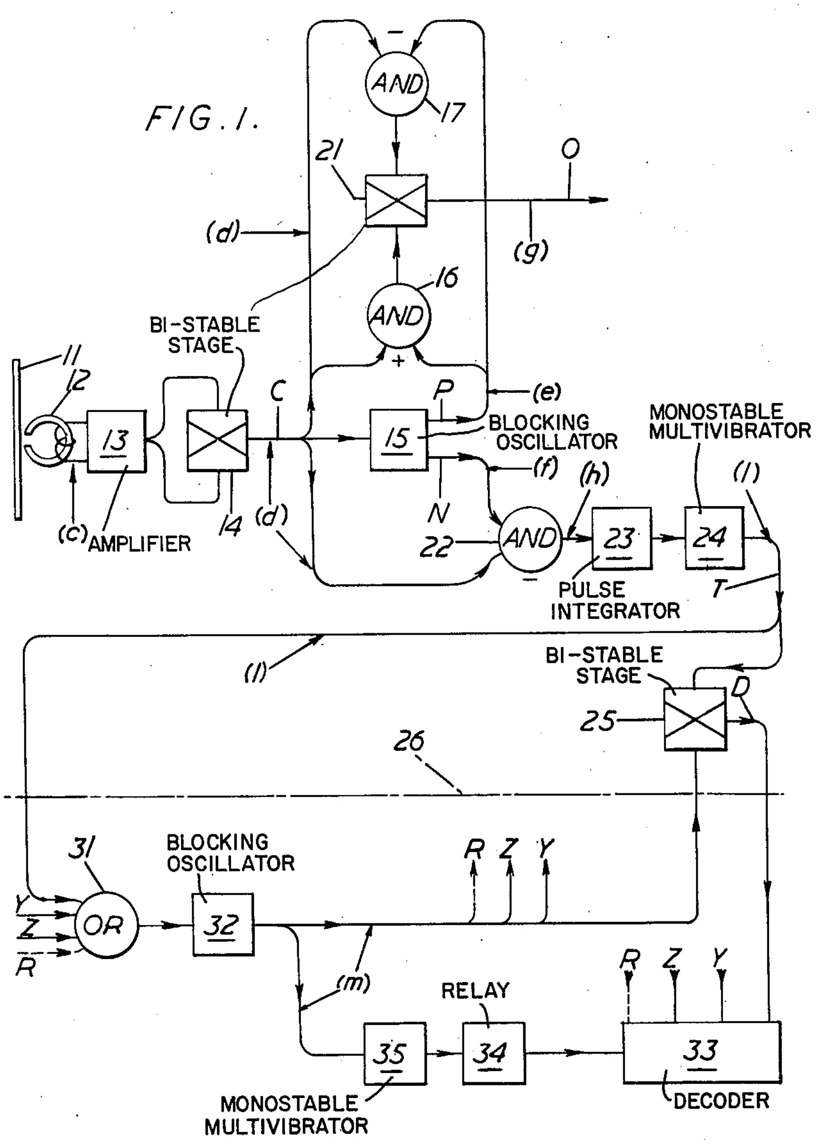
FIGURE 1 is a schematic diagram of one embodiment of the invention.

The invention will now be described by way of example as applied to machine-tool control where the signals for exercising the main control are recorded on magnetic tape in three parallel control tracks, one for each of three mutually perpendicular axes of tool movement and hence designated hereinafter the X, Y, and Z tracks.

Each main control signal is in the form of a rectangular magnetic wave the phase of which varies relative to a reference rectangular wave in accordance with the tool movement required in the direction of the axis concerned. The reference waveform, which is of fixed wavelength, is common to all three tracks and is recorded alongside them in a fourth track, which will be designated track R.

At intervals along the tape are short regions common to all tracks where the three main control signals contain auxiliary control signal pulses, a group of such pulses being present in or absent from each of these regions of the respective X, Y, and Z tracks in accordance with a binary code.

Each such recorded group, when present, represents a single auxiliary signal by, normally, eight negative pulses contained within eight successive positive half-cycles of the main signal waveform, each to each. The distance between the respective leading edges of half-cycle and pulse is fixed; hence the distance between their trailing edges varies, since the signals are phase-modulated. The pulse is short enough to be contained within the half-cycle, however short the latter may be in response to the modulation.

To separate the component main and auxiliary signals from this composite signal, each of the three tracks is provided with apparatus some of which is individual to that track and which is alike for all three tracks, and some of which is shared with the other two tracks. The apparatus for the X track will now be described with reference to the accompanying drawings.

The composite waveform is derived from the appropriate track on the magnetic tape 11 by an electromagnetic pickup 12 arranged to respond to both component signals of the waveform and deliver its output by way of an amplifier 13 to trigger a bi-stable stage 14. The output from this stage is applied by way of a lead C (which is given that designation because, as will be shown later, it carries the composite signal, as reconstituted) to control a pulse generator in the form of a blocking oscillator 15 which in response to each triggering supplies coincident positive and negative gating pulses over leads P and N respectively.

Leads C and P are connected to the inputs of two two-entry AND gates 16 and 17 in parallel. Gate 16 passes a signal when both inputs are positive whereas gate 17 does so when both inputs are negative. The outputs from these gates are applied to the respective trigger input points of another bi-stable stage 21, for which the gates act respectively as parts of the setting and resetting means. To one of the output points (to be particularised later) of stage 21 is connected an output lead O.

Leads C and N are connected to the inputs of another two-entry AND gate 22 which passes a signal when both inputs are negative. This signal is applied to a pulse integrator 23 which has a time constant such that the integrator derives a response on the receipt from gate 22 of a predetermined proportion—such as six—of the eight pulses of a group during the period allocated to the reception of the eight pulses when the tape is moving past the pickup at a predetermined speed.

The response from the integrator is applied to trigger a monostable multivibrator stage 24 the output from which is applied as input to output arrangements which include an auxiliary bi-stable stage 25.

The apparatus so far described, and depicted above the broken line 26, is individual to the X track and is repeated for each of the other two tracks. The rest of the apparatus, depicted below line 26 and constituting the remaining output arrangements, is common to all three tracks.

The common equipment includes a three-entry OR gate 31 to which is connected as input the output from stage 24 and the output from the corresponding stage of each of the other tracks Y and Z. The signal passed by this gate is applied to trigger a blocking oscillator 32 the response of which is applied to the other input point of stage 25 and to the corresponding stages of the other tracks. Stages 31 and 32 constitute resetting means for all three auxiliary bi-stable stages 25.

One of the output points of stage 25 is connected over a lead D to an auxiliary signal decoder 33, working on the binary scale, which also receives like connections from the other two tracks. The energising supply for the decoder is controlled by a relay 34, which itself is controlled by another monostable multivibrator 35, actuated by the output from oscillator 32.

Figure 2:
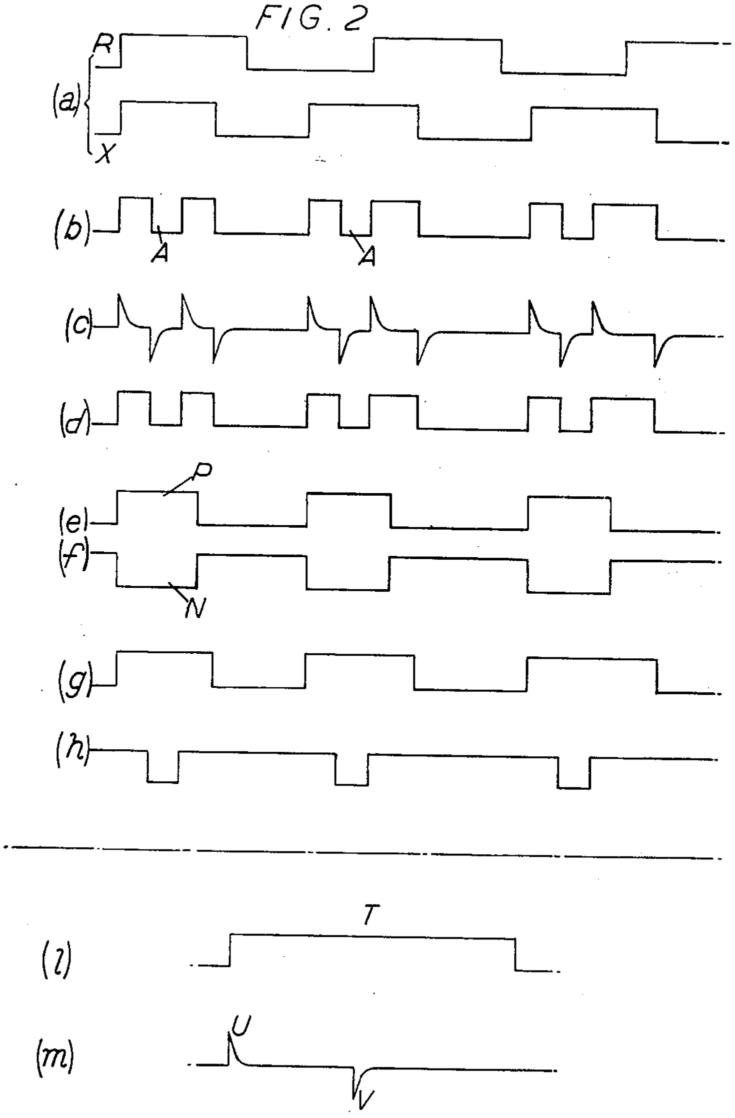
FIGURES 2 and 4 are sets of waveforms to illustrate the operation of the embodiments of FIGURES 1 and 3 respectively.

The waveforms of FIGURE 2 show at (*a*) the signals as recorded in the R (reference) track and in the X track; the latter are depicted with a phase-modulation which is exaggerated for clarity and are shown free from any auxiliary signal pulses.

At (*b*) the X signal is assumed to include an auxiliary signal in the form of eight negative pulses A, one contained within each of eight consecutive positive half-cycles of the main signals. Only three of such pulses and half-cycles are shown in the drawing. Waveform (*b*) therefore shows the composite signal, as defined above.

The response of the apparatus to an auxiliary signal in the auxiliary control region of the X track, where the recorded waveform is of the composite kind shown at (*b*), is as follows.

As the tape 11 passes under pickup 12 at the steady determined speed, the response to the recorded waveform (*b*) of the pickup, depending as it does on the rate of change of flux, is of the differentiated squarewave form shown at (*c*), a sharp positive pulse being derived from each positive-going edge of the composite signal and a sharp negative pulse from each negative-going edge. Each of these positive pulses, after amplification in stage 13, switches bi-stable stage 14 to one of its stable states, whereas each negative pulse switches it to the other stable state. Thus the output of the stage over lead C has the waveform (*d*), which thus reproduces electrically and dynamically the static composite magnetic waveform on the X track. Lead C is of course connected to that output point of stage 14 which gives this reconstituted composite waveform the appropriate sense.

Each positive half-cycle of waveform (*d*) initiates by its leading edge the generation by oscillator 15, and the delivery over output leads P and N respectively, of the coincident positive and negative gating pulses above referred to. The length and location of each of these gating pulses is such that the pulse is contained within the half-cycle which originated it, and itself contains an auxiliary signal pulse if present in that half-cycle. Thus the leading edge of each gating pulse precedes the auxiliary pulse A (if present) and its trailing edge follows the auxiliary pulse but precedes the trailing edge of the initiating half-cycle. The leading edge of the gating pulse, though actually following that of the originating half-cycle, may for practical purposes be considered as coincident with it. These gating pulses, which for convenience will be designated P and N, like the leads which carry them, are shown at (*e*) and (*f*) respectively.

AND gate 16 passes to bi-stable stage 21 a positive switching signal during the coincidence of a pulse P and the positive portion of the composite signal (*d*) which precedes pulse A, if present. Hence stage 21 is in effect switched to one of its stable states in synchronism with the leading edge of each main recorded positive half-cycle of the X signal (*a*), whether a pulse A is contained in that half-cycle or not.

Gate 17, on the other hand, passes a switching signal only when waveforms (*d*) and (*e*) are both negative, that is, only when pulse P and the initiating positive half-cycle have both terminated; as pulse P terminates first, gate 17 passes the switching signal as soon as the initiating half-cycle ends. Hence stage 21 is in effect switched to its other stable state in synchronism with the trailing edge of that main recorded positive half-cycle. Stage 21 thus accurately reproduces the modulated main signal of the X track free from the pulses A. The output waveform is therefore as shown at (*g*), the lead O being connected to that output point of the stage which gives this signal the appropriate sense.

The remainder of the equipment is used for deriving the auxiliary signal free from the main signal. For this purpose AND gate 22 passes a signal whenever a pulse A coincides with a pulse N, and thereby separates the auxiliary pulses from the composite waveform. The output from this gate is shown at (*h*).

To ensure that an auxiliary signal is derived only when the track contains a group of at least six auxiliary pulses within the auxiliary control region, there is provided the integrator 23. As already explained, this stage has a time constant, chosen in relation to the speed at which the tape passes the pickup, such that a predetermined voltage level is reached only when six pulses have arrived in the period allocated to the reception of eight. The six pulses may occupy the positions of any of the eight, and six are chosen as the critical number rather than eight to allow for one or two pulses becoming omitted or lost from the tape. The integrator is arranged to pass a signal to trigger stage 24 as soon as that voltage level is reached, but not before.

The remaining waveforms (*l*) and (*m*) of FIGURE 2 are drawn to a smaller time scale than waveforms (*a*) to (*h*).

On being so triggered from the integrator, stage 24 generates a positive pulse T, see waveform (*l*), of fixed length. The leading edge of this pulse serves to switch bi-stable stage 25 to that one of its stable states which represents the presence of an auxiliary signal in the X track.

The pulses T also serve to reset the apparatus prior to its response to the groups of auxiliary signal pulses present in the auxiliary control region now being received, the resetting action being effective on those of stages 25 of track X and the corresponding stages of the other tracks which were set during the passage of the previous auxiliary control region. To effect this resetting, pulse T is applied to OR gate 31 in common with T pulses from each of the other tracks as contain an auxiliary signal. Thus gate 31 causes blocking oscillator 32 to be triggered by whichever of these pulses T reach the gate first. Hence the resetting is effected by whichever integrator derives the first response. Once triggered, oscillator 32 is unaffected by any later pulses T of the present control region.

On being thus triggered, oscillator 32 immediately generates sharp positive resetting pulse U, see waveform (*m*), followed after an interval approximately equal to half the length of pulse T by a sharp negative pulse V.

Pulse U performs the actual resetting of the stage 25. This resetting pulse is very short compared with the corresponding pulse T, which is amply long enough for the resetting pulse to terminate first, and so allow the pulse T to set stage 25 after pulse U has reset it. This pulse U simultaneously resets the previously set ones of the corresponding stages of the other tracks. As only one pulse U is generated for all three tracks there is no risk of any of these bi-stable stages being reset prematurely.

Stages 25 act as staticisers for the auxiliary signals of the respective tracks. They set the relays of the binary decoder 33 to the condition which represents the appropriate overall response to the combination of tracks containing an auxiliary signal in the present auxiliary control region on the tape. These relays remain disconnected from their supply until pulse V triggers stage 35 to operate relay 34 to close the energising circuit, thereby causing the decoder 33 to effect whatever auxiliary function the auxiliary signals are designed to exercise. Pulse V is spaced sufficiently from pulse U to ensure that the decoder is not energised until it has been set in response to even the most delayed auxiliary signal, yet is spaced sufficiently within the span of pulse T to ensure that none of the stages 24 has yet been reset in response to signals from the next auxiliary control region by the time the decoder is energised.

After the auxiliary control region has passed the pick-up and the X waveform has reverted to the form shown at (*a*), the apparatus continues to operate as above described to provide over lead O the electrical signal of waveform (*g*). Now, however, though AND gate 22 continues to receive the N pulses, it no longer receives the auxiliary pulses in coincidence with them. Hence no signal is passed by gate 22 and the rest of the equipment remains inoperative until the next group of auxiliary pulses reaches the pick-up.

Figures 3, 4:
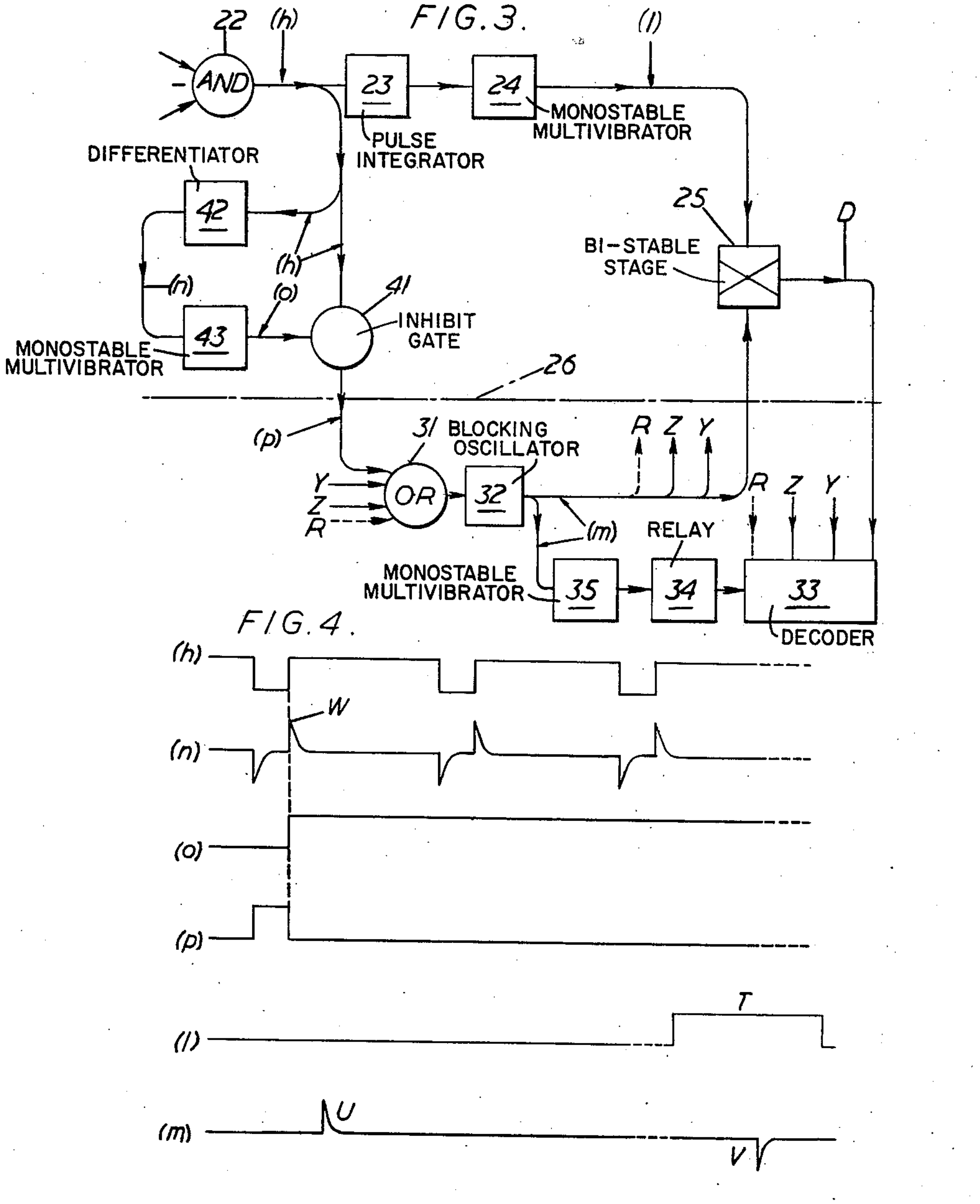
FIGURE 3 is a schematic diagram of a part of the arrangement of FIGURE 1 modified in accordance with another embodiment.

Stage 25 may alternatively be reset by the first auxiliary pulse (FIG. 2, waveform (*h*)) of each auxiliary region, rather than by waveform (*l*). The necessary modifications to the arrangement of FIGURE 1 are shown in FIGURE 3.

Here the output from gate 22 is additionally applied as input to an Inhibit gate 41, the output from which is applied to OR gate 31 along with the outputs from the corresponding Inhibit gates of the apparatus for the Y and Z tracks. To derive a control signal for gate 41 the (*h*) waveform is applied to a differentiating circuit 42 which controls a monostable multivibrator 43, which itself controls gate 41. Except when closed by a signal from stage 43, in the manner to be described, gate 41 is open to pulses received from gate 22. Stages 41 to 43 are individual to each track and so are shown above the line 26. The common equipment, shown below line 26, is as before.

In operation, the first auxiliary pulse of an auxiliary pulse region passes through gates 22 and 41 to reach gate 31 as waveform (*p*) (see FIG. 4) and trigger blocking oscillator 32. Gate 41 reverses the pulse so as to give it the sense necessary to effect this triggering. From this first pulse, differentiator 42 produces waveform (*n*) the trailing pulse W of which triggers stage 43 to generate an inhibiting signal, waveform (*o*), whilst in its unstable condition. The signal closes gate 41, the unstable condition of stage 43 lasting long enough to keep the gate closed against further auxiliary pulses for the rest of that auxiliary control region, thereby preventing any more pulses from reaching blocking oscillator 32. Similarly only the first auxiliary pulses of the same auxiliary pulse region of the other two tracks reach oscillator 32, but it responds to only the one of the three that reaches it first.

In response, oscillator 32 produces pulse U (waveform (*m*)) as before, but this time slightly after the end of the triggering pulse of waveform (*p*), to reset all three stages 25. As the generation of pulse U is initiated by the first auxiliary pulse of each region, pulse U clearly occurs before stages 23 and 24 have developed pulse (*l*). (In FIG. 4 waveforms (*l*) and (*m*) are shown to the same time scale as waveforms (*h*), (*n*), (*o*), and (*p*).) Hence all three stages 25 have been reset before pulse (*l*) reaches them. On the arrival of the respective pulses (*l*), stages 25 are set as before. Oscillator 32 is adjusted so that each pulse V of waveform (*m*) does not occur until all the staticisors 33 have been set. As in this arrangement waveform (*l*) does not control oscillator 32 but only stages 25, its length can be made shorter than in the arrangement first described.

The invention also has application where the signals to be separated are not recorded but are received in electrical form already. The apparatus may be exactly as described above with reference to FIGURE 1 except that components 11 to 14 are omitted and the received signal, after amplification if necessary, is applied direct to lead C.

In either of these embodiments the auxiliary signals may alternatively be in the form of positive pulses within negative half-cycles of the main signal.

If an additional auxiliary signal is required, auxiliary pulses may be added to the main reference waveform R (waveform (*a*), FIG. 1) during an auxiliary region. The apparatus for separating the auxiliary pulses from the R waveform may be exactly as shown above line 26 in FIGURE 1. As however the main waveform is here of fixed length—in other words, as there is here no modulation to reproduce—that part of the apparatus which reproduce the main waveform without the auxiliary pulses may be somewhat simplified.

The equipment common to the X, Y, and Z tracks now includes channels to and from the equipment individual to the R track, as shown in FIGURE 1 in broken lines. The operation is otherwise as before, except that the staticisor 33 now operates on a four-digit binary code.

What we claim is:

1. Apparatus for separating the component signals of at least one composite electrical signal consisting of a main signal of rectangular waveform of variable wavelength and an auxiliary signal in the form of a predetermined number of pulses of one sense contained within a like number, each to each, of successive half-cycles of the other sense of the main signal, including for each composite signal a pulse generator arranged to be actuated by the leading edge of each half-cycle of said other sense of the main signal to generate at least one gating pulse short enough to be contained within that half-cycle and long enough to contain an auxiliary signal pulse if present in that half-cycle, main-signal separating means arranged to utilize gating pulses from said generator to derive from the composite signal the main signal only, auxiliary-signal separating means arranged to utilize such gating pulses to derive from the composite signal the auxiliary signal pulses only, an integrating stage arranged to receive the auxiliary signal pulses from said separating means and to derive a response whenever a predetermined proportion of said number of those pulses is received during the period allocated to the reception of said number of them, and output arrangements for actuation by the response of the integrating stage.

2. Apparatus as claimed in claim 1 wherein the main-signal separating means includes a bi-stable device, setting means for causing that device to be set to one stable state by the leading edge of each gating pulse, resetting means for causing the device to be reset to its other stable state after the termination of that gating pulse by the trailing edge of the main signal half-cycle which initiated that pulse, and connections for deriving the main signal, free from the auxiliary signal, from the output of appropriate sense of said device.

3. Apparatus as claimed in claim 2 wherein the resetting means includes a two-entry AND gate and connections for applying to the gate as inputs gating pulses of said other sense from the generator and the composite signal, the gate being arranged to pass a signal to reset said device to its first state when both input signals are of said one sense.

4. Apparatus as claimed in claim 1 wherein the auxiliary-signal separating means includes a two-entry AND gate, connections for applying to the gate as inputs gating pulses of said one sense from the generator and the composite signal, and connections for applying the output from the gate to the integrating stage, the gate being arranged to pass a pulse to the integrating stage when both input signals are of said one sense.

5. Apparatus as claimed in claim 1 where there is more than one composite signal, wherein the periods allocated to the reception of said number of auxiliary pulses occur in a region common to all the composite signals, and said output arrangements include for each composite signal an auxiliary bi-stable device, with connections to that device from the output of the associated integrating stage such as to cause the device to be set to one stable state by the response of that integrating stage, said output arrangements including for all the composite waves in common resetting means arranged to be actuated by whichever integrating stage derives the first response during a said region and when so actuated causes such of the auxiliary bi-stable devices as are in their first stable states to be reset to their second stable states, each response of an integrator lasting long enough to set the associated auxiliary device after any such resetting thereof, and an auxiliary signal decoder arranged to be actuated by the auxiliary devices so as to give a response determined by which of said devices is in its first state.

6. Apparatus as claimed in claim 5 modified in that said resetting means is arranged to be actuated by whichever apparatus derives from a composite signal the first auxiliary pulse during a said region.

7. Apparatus as claimed in claim 5 wherein the resetting means includes a stage for deriving on actuation a resetting pulse for all the auxiliary devices, that resetting pulse terminating before the termination of the corresponding response of each integrating stage.

8. Apparatus as claimed in claim 5 wherein the arrangements are made for energising the decoder in the interval between the re-setting of said auxiliary devices in response to signals from each auxiliary control region and the re-setting of the devices in response to signals from the next region.

References Cited in the file of this patent

UNITED STATES PATENTS

| | | |
|---|---|---|
| 2,864,077 | De Turk | Dec. 9, 1958 |
| 2,889,467 | Endres et al. | June 2, 1959 |
| 2,921,190 | Fowler | Jan. 12, 1960 |